United States Patent [19]

Stecklein et al.

[11] Patent Number: 5,020,826
[45] Date of Patent: Jun. 4, 1991

[54] VEHICLE SUSPENSION SYSTEM

[75] Inventors: Gary L. Stecklein, San Antonio; Glenn R. Wendel, Pipe Creek, both of Tex.

[73] Assignee: Southwest Research Institute, San Antonio, Tex.

[21] Appl. No.: 432,683

[22] Filed: Nov. 6, 1989

[51] Int. Cl.$^5$ ............................................. B60G 11/26
[52] U.S. Cl. ................................... 280/707; 280/714; 267/64.23
[58] Field of Search ...................... 280/708, 707, 714; 267/64.23

[56] References Cited

U.S. PATENT DOCUMENTS 4,828,231  5/1989  Fukumura et al. .............. 267/64.23

Primary Examiner—Kenneth R. Rice
Attorney, Agent, or Firm—Baker & Botts

[57] ABSTRACT

A vehicle suspension system that resiliently supports a suspended portion of a vehicle on a non-suspended portion while at the same time preventing pitch and roll that are caused by acceleration, deceleration and turning. The system includes a linear actuator such as a single-acting hydraulic cylinder interconnected through a control system with variable displacement pumps/motors and an accumulator. The accumulator is charged to apply enough pressure in the hydraulic system to support the suspended portion of the vehicle in static condition. The variable displacement pumps along with the controls sense the pressure changes occurring in the linear actuators to prevent movement thereby maintaining a normal, level position of the vehicle.

8 Claims, 4 Drawing Sheets

VEHICLE SUSPENSION SYSTEM

FIELD OF THE INVENTION

This invention relates generally to suspension systems for vibration and acceleration isolation between members such as for vehicles between wheels and the chassis. More particularly, but not by way of limitation, this invention relates to a resilient, damped suspension system for vehicles.

BACKGROUND OF THE INVENTION

Since the advent of vehicles, attempts have been made to provide a suspension system for occupants and cargo carried by the vehicle that isolate the loads from the rough roads over which the vehicle travels. Also, and more recently with the advent of high speed vehicles, it is desirable to provide a suspension system which permits the vehicle to corner at relatively high rates while maintaining the vehicle in a essentially level position. It is also desirable during either acceleration or stopping to maintain the vehicle in an essentially level position. In terms of art, it is highly desirable to be able to control, if not avoid entirely, the roll and pitch that occurs as the vehicle maneuvers.

It is not only desirable to provide an active suspension system that functions to negate movements of the vehicle away from the level, but to provide a relatively comfortable system of suspension including damping of vibrations or movements between the suspended and non-suspended portions of the vehicle while providing a soft resilient ride for the passengers and cargo of the vehicle.

Lotus Motor Company has developed for their motorcars an active spring rate control which utilizes a hydraulic system with electrohydraulic servocontrol valves and hydraulic linear actuators that are controlled by a computer system responding to an accelerometer and gyrosensor mounted on the vehicle. Such system is necessarily complex and extremely expensive.

The object of this invention is to provide a practical means of providing an active suspension system that is less complex and expensive than other systems and one that provides an enhanced ride as compared to the damper controlled systems that are currently in production on vehicles.

SUMMARY OF THE INVENTION

This invention provides an improved suspension system for vehicles that includes hydraulic strut means located between the suspended and unsuspended portions of the vehicle, pump and motor means for providing and receiving pressurized hydraulic fluid to and from the strut means, an accumulator means connected to each strut means for supporting the weight of the suspended vehicle members in a static condition, and an accumulator means connected with the pump means for providing pressurized fluid to the pump and motor means.

Another aspect of the invention contemplates an improved accumulator for use with the vehicle suspension system that includes a hollow housing and a bellows dividing the housing into first and second compartments for receiving a compressible gas and hydraulic fluid, respectively. The metal bellows providing a long lasting divider or separator that is dependable and requires no maintenance.

DETAILED DESCRIPTION OF THE PREFERRED EMBODIMENT

Figure 1:
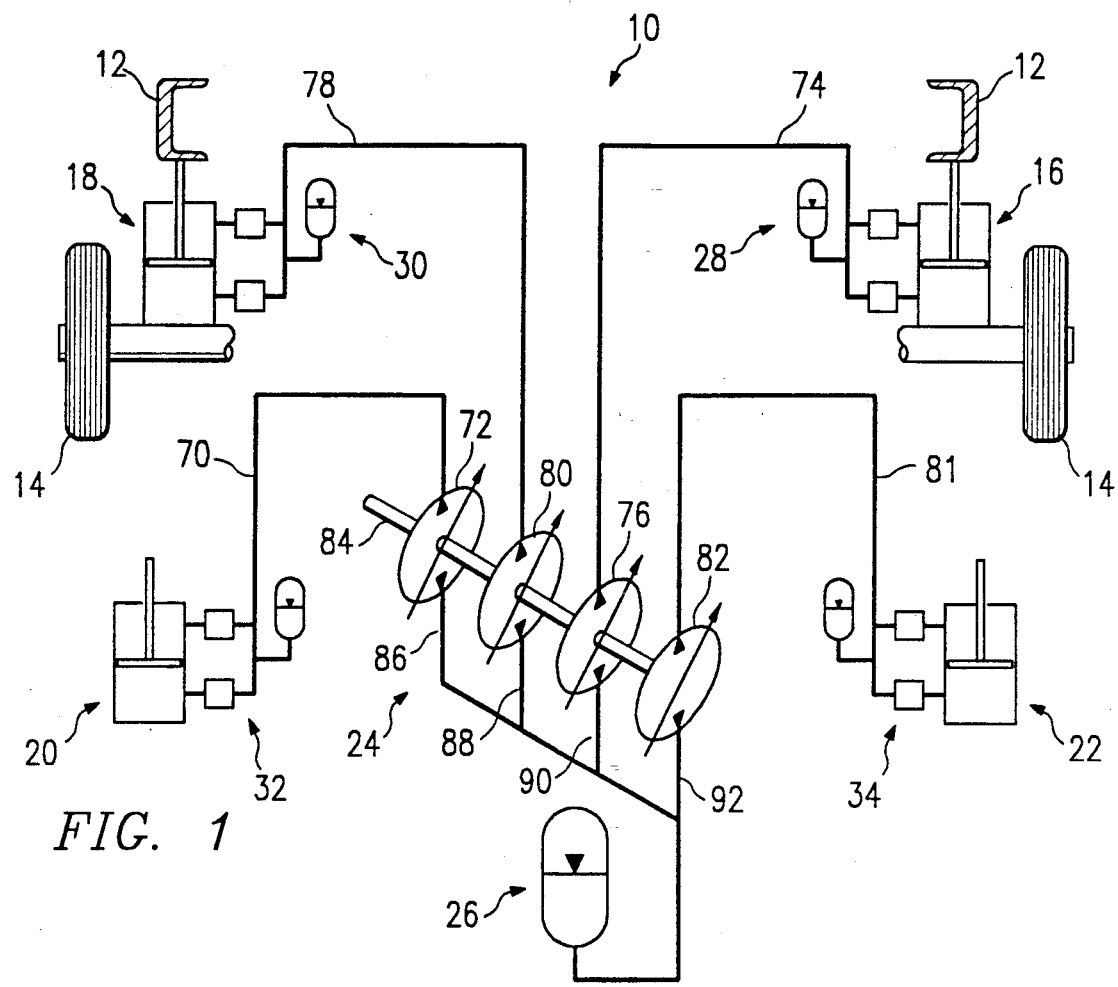
FIG. 1 is a schematic view of a vehicle suspension system that is constructed in accordance with the invention.

Referring to the drawing and to FIG. 1 in particular, shown therein and generally designated by the reference character 10 is a vehicle suspension system. The suspension system 10 can be utilized in any type of vehicle, for instance in motorcycles, tanks, and in an automobile to support a chassis 12 on wheels 14. The chassis 12 and only two wheels 14 are illustrated in FIG.1. The suspension strut assembly 16 is positioned in supporting arrangement between the chassis 12 and the wheel 14.

As shown in FIG. 1, there are four suspension strut assemblies 16, 18, 20 and 22. Although only two wheels 14 are illustrated, it will be understood that the strut assemblies 20 and 22 also are positioned between other wheels (not shown) of the vehicle and the chassis 12.

The strut assemblies 16, 18, 20 and 22 are interconnected by appropriate hydraulic circuits, which will be described, to a pump/motor assembly that is generally designated by the reference character 24. The pump/motor assembly 24 is in turn connected to an accumulator assembly 26 that also functions as a reservoir for the hydraulic system. Interposed between the strut assemblies 16, 18, 20 and 22 and the pump/motor assembly 24 are control assemblies 28, 30, 32, and 34, respectively. The control assemblies and strut assemblies are similar in function and only the strut assembly 18 and control assembly 30 will be described more fully in connection with the enlarged, fragmentary schematic view of FIG. 2.

As shown more clearly therein, the suspension strut assembly 18 includes a hollow body 36 which has a generally cylindrical bore 38 therein. Located in the bore 38 and positioned for reciprocation therein is a piston 40 having a piston rod 42 extending from one end of the body 36. The strut assembly may be described as a single acting linear actuator.

The strut is designed with both ends of the linear actuator interconnected. Compression of the strut results in a net fluid displacement equal to the rod area times the compression distance. This fluid is displaced into the accumulator which in turn compresses the gas thereby increasing the gas pressure. The increased gas pressure is reflected in increased fluid pressure which acts on both ends of the cylinder. The net result being pressure which acts on the rod area which supports the externally applied load. The function of the piston is to provide controlled fluid flow (no leakage past the piston) for damping.

Figure 2:
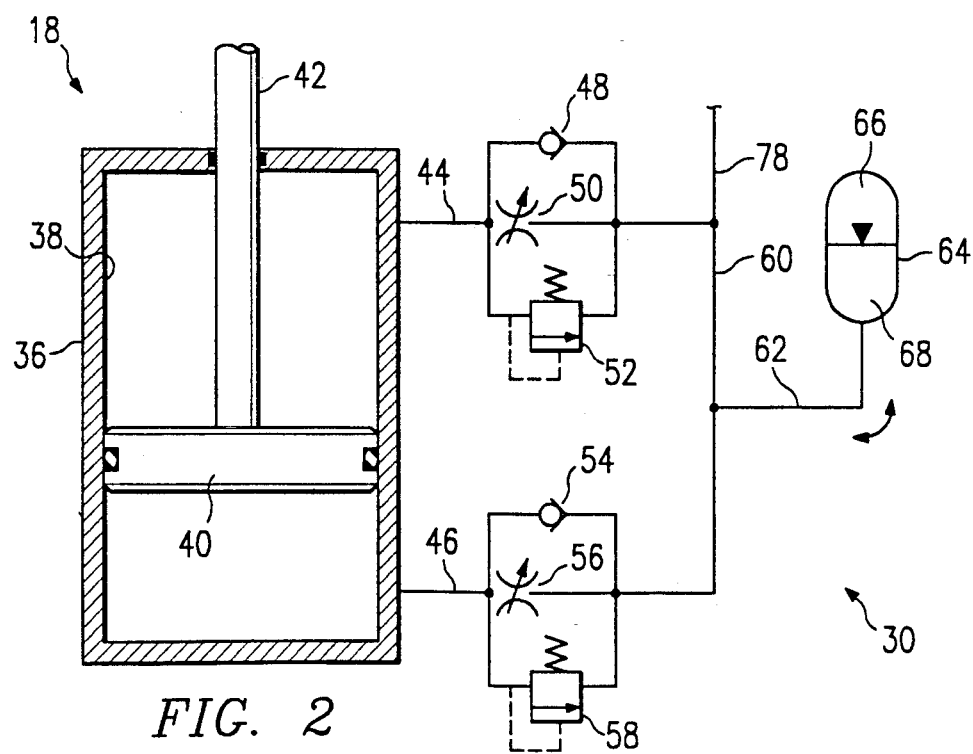
FIG. 2 is an enlarged schematic view of a portion of the system of FIG. 1.

The control assembly 30, as illustrated in FIG. 2, includes a conduit 44 located on one side of the piston 40 and conduit 46 located on the opposite side thereof. The conduits 44 and 46 are in communication with the bore 38. Connected in parallel relationship to the conduit 44 is a check valve 48, a variable orifice valve 50 and a relief valve 52.

Similarly, the conduit 46 is connected to a check valve 54, a variable orifice 56, and a pressure relief valve 58 which are also arranged in parallel relationship. The check valves 48 and 54 are arranged to permit fluid flow toward the strut assembly 18 while preventing flow in the opposite direction. The variable orifice valves 50 and 56 are provided to produce a controlled pressure drop across the proportional to the fluid flow rate through them to dampen the movement of the piston 40 in the bore 38. Relief valves 52 and 58 are arranged to open at a preset pressure in the conduits 44 and 46, respectively.

Conduit 60 connects the valve 48, orifice 50 and relief valve 52 in parallel with the valve 54, orifice 56 and relief valve 58. A branch conduit 62 extends to a small gas over hydraulic accumulator 64 that includes a compressible gas filled chamber 66 and a hydraulic fluid chamber 68 therein. The accumulator 64 provides resiliency to the strut assembly 18. For example, if the accumulator 64 with the compressible gas therein were not provided, and the body 36 filed with fluid, the piston 40 would be rigidly positioned in the cylinder and could not move unless fluid on one side or the other thereof were displaced. Since the fluid is essentially incompressible, an arrangement of this type would provide virtually rigid connection between the chassis 12 and the wheels 14.

However, because of the compressible gas in the accumulator 64, hydraulic fluid on the appropriate side of the piston 40 can be displaced into the accumulator 64 compressing the gas contained therein and permitting movement of the piston 44 and causing the restoration of the piston 40 to its initial position.

Only one of the control assemblies which are connected with the suspension strut assemblies has been described in detail. However, it will be understood that all of the assemblies may be identical.

Extending from the conduit 60 is a hydraulic conduit 78 that connects the control system 30 with a variable displacement pump/motor 80 which forms part of the pump/motor assembly 24. Similarly, the control assembly 28 is connected by a conduit 74 which connects the strut assembly 16 with a variable displacement pump/motor 76 that also forms a part of the -pump/motor assembly 24. Conduit 70 extends from the strut assembly 20 to a variable displacement pump/motor 72 and conduit 81 extends from the strut assembly 22 to a variable displacement pump/motor 82. The variable displacement pumps/motors 72 and 82 also form part of the pump assembly 24. As will be more fully described in connection with FIGS. 4a, 4b and 4c, the pumps are preferably vane-type, variable displacement pump which upon a reversal flow, may also act as a motor.

As illustrated in FIG. 1, all of the pumps 72, 76, 80 and 82 are driven by a common shaft 84. The advantage of the single shaft drive is that a single power takeoff from the vehicle engine can be utilized to drive the entire suspension system thereby reducing the size, weight and cost of the system. An electric motor or other prime mover could be utilized for driving the pumps if desired. Further, the pumps 24 could be individually driven but such an arrangement could overly complicate the system and increase its size and cost.

Figure 3:
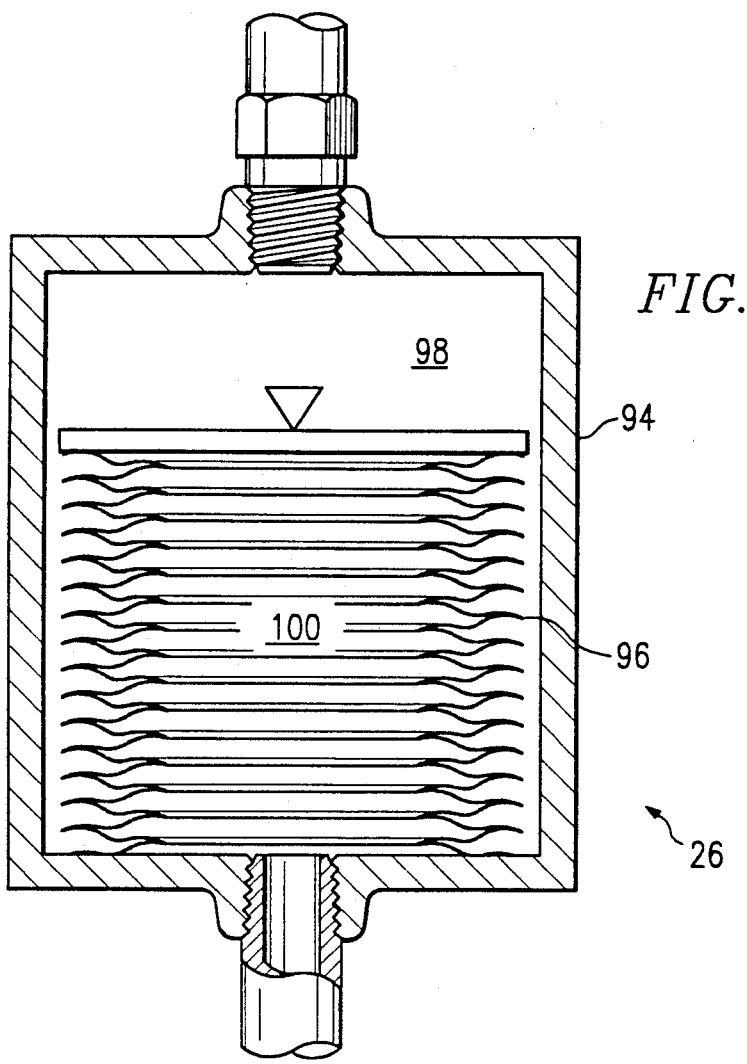
FIG. 3 is an enlarged view illustrating an accumulator that is also constructed in accordance with the invention.

Conduits 86, 88, 90 and 92 connect the pumps 72, 80, 82 and 86, respectively, with the accumulator assembly 26. The accumulator assembly 26 is shown in more detail in FIG. 3. This same figure is representative of the accumulators used with each individual strut. As illustrated therein, the accumulator assembly 26 includes a hollow housing 94 having a bellows 96 located therein. The bellows 96 forms a divider in the housing 94 defining a gas chamber 98 and a liquid chamber 100. The gas chamber 98 is filled with compressible gas such as nitrogen and hydraulic fluid utilized in the suspension system 10 occupies the chamber 100.

The bellows 96 is preferably constructed from metal to insure longevity. Also, it should be pointed out that the volume occupied by the liquid filling the bellows 96 is somewhat greater than the volume occupied by the gas since the accumulator assembly 26 also serves as a reservoir for such fluid. The relatively large volume of the bellows used for the hydraulic fluid provides for the storage of a considerable amount of reserve hydraulic fluid that is required to provide adequate resiliency for each of the strut assemblies.

The primary function of the accumulator reservoir assembly 26 is to impose fluid pressure on the entire system 10 so that the pressure differential between the reservoir 26 pressure and any steady or static individual strut pressure required to support the chassis 12 is minimized. It is intended that the pistons 40 and rods 42 be positioned in the strut assemblies in intermediate positions to permit movement of the pistons 40 and rods 42 in either direction.

Figure 6:
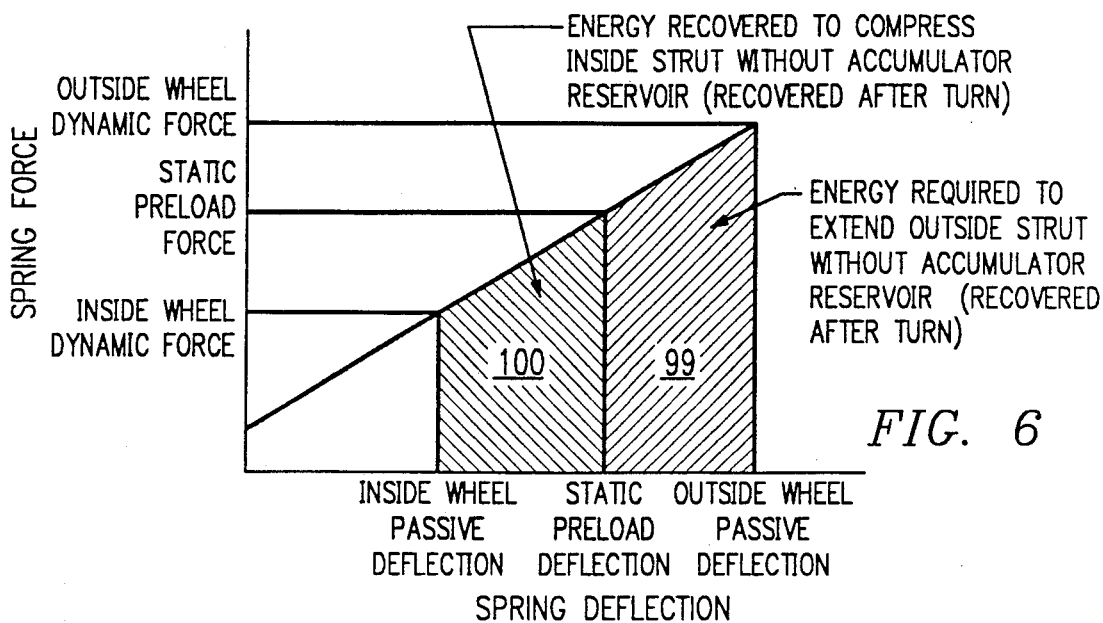
FIG. 6 is a graph illustrating energy utilization in the suspension system of FIG. 1.
Figure 7:
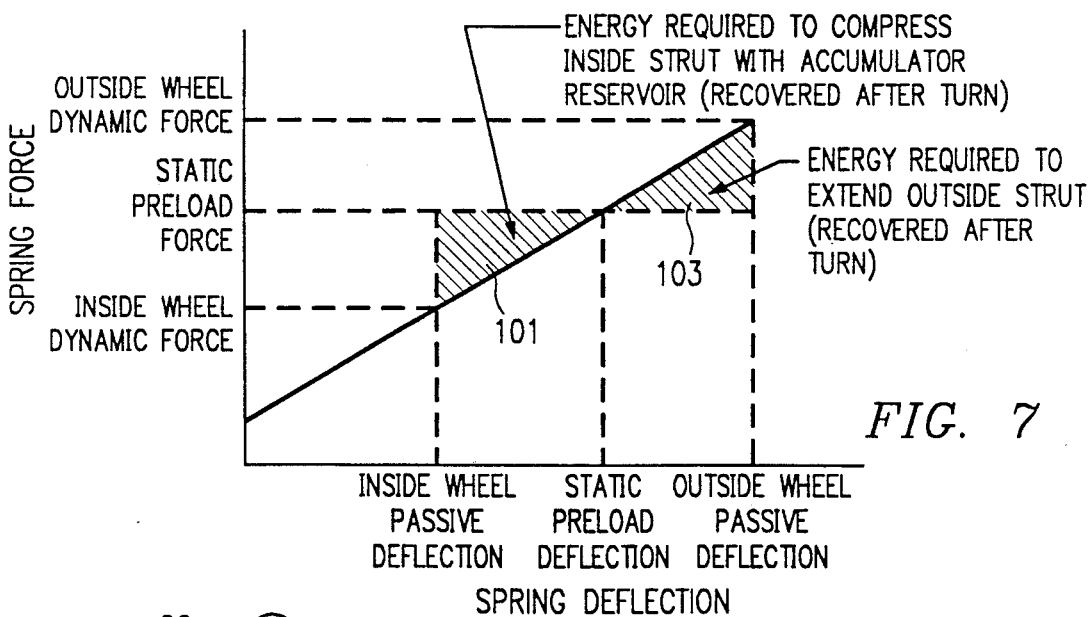
FIG. 7 is a graph similar to FIG. 6, but illustrating a suspension system that does not include the accumulator reservoir of the system of FIG. 1.

FIGS. 6 and 7 will describe the reasons for this imposed pressure.

Figure 4C:
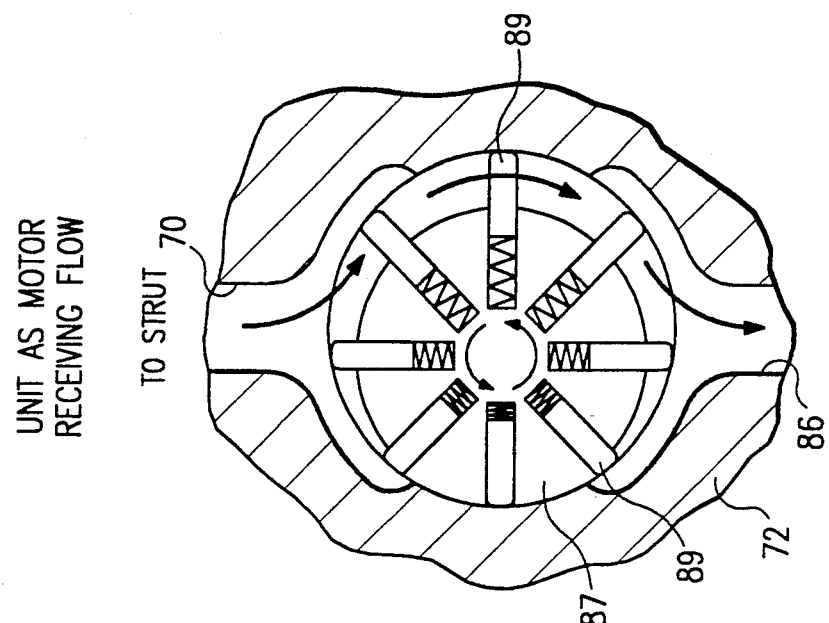
FIG. 4a, 4b and 4c, are views of variable displacement pump and motor combinations that are utilized in the suspension system of FIG. 1.
Figure 4B:
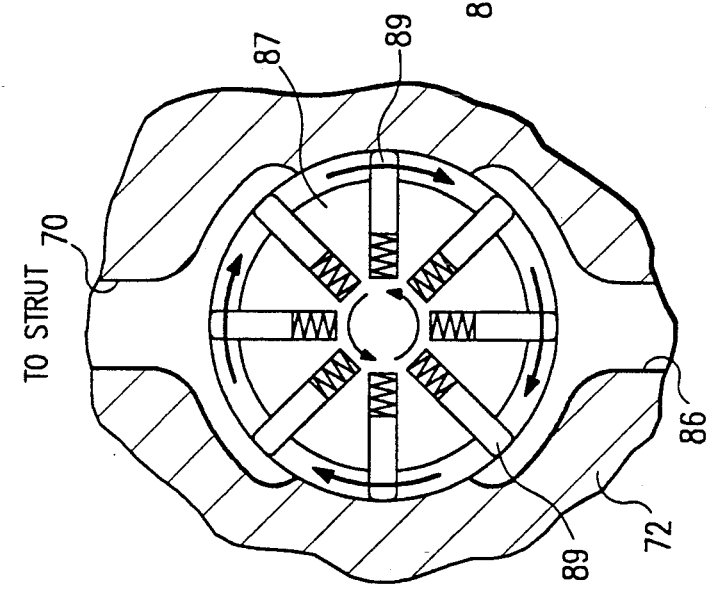
Figure 4A:
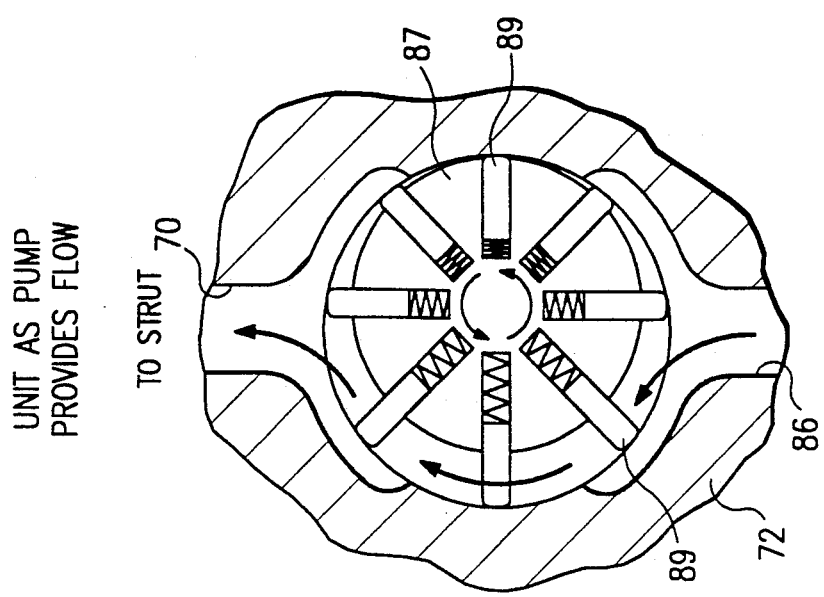

FIGS. 4a, 4b, and 4c illustrates a typical variable displacement pump/motor 72 that may be utilized in the system 10. FIG. 4b illustrates the position of a the rotor 87 when there is no fluid flow to or from conduit 70. In this condition, no pumping/motoring action occurs and fluid is simply circulated by vanes 89 when the pump/motor is in operation. When the suspension system is inactive and the pump/motor is in the no-flow position, a valve may be provided in conduit 70 to completely block the strut flow path. In this case, no strut leakdown will be possible. The valve(s) may be pilot operated, solenoid operated, or operated by some other source indicative of system actuation. When functioning to provide flow to the conduit 70, the centerline of the rotor 87 is displaced as illustrated in FIG. 4a so that fluid is swept by the vanes 89 from the conduit 86 through the pump 72 and outwardly through the conduit 70 toward the strut assembly 20.

FIG. 4c illustrates the condition of the pump/motor 72 when fluid from strut 20 passes to the accumulator assembly 26. In this condition, the center-line of the rotor 87 has been displaced to the left and fluid flowing from the conduit 70 drives the vanes 89 and the rotor 87 in a direction so that the fluid will return through the conduit 86 to the accumulator assembly 26.

OPERATION OF THE EMBODIMENT OF FIG. 1

With the vehicle in operation, the pump/motor assembly 24 is also in operation. Assuming that the vehicle is either sitting still or on a very level road the rotor 89 of the pump 72 is in the general position shown in FIG. 4b with no fluid being displaced.

If the vehicle is caused to roll about its longitudinal center-line, such as when making a turn or driving along a hillside, the force applied to the strut on the low side (outside of the turning vehicle) increases and the force applied to the strut on the uphill side decreases. Accordingly, the pressure increases on the downhill side and decreases on the uphill side. The pressure increases in strut assemblies 16 and 22, if the right side of the vehicle is lower and decreases in the strut assemblies 18 and 20, assuming the left side is higher.

The pumps/motors 76 and 82 have the rotors 87 therein repositioned as illustrated in FIG. 4a upon sensing the compression in the strut assemblies 16 and 22 so that fluid is directed to the downhill strut assemblies 16 and 22. Simultaneously, the extension in the strut assemblies 18 and 20 is sensed and pumps/motors 72 and 80 which have the rotors 87 therein are moved to the position illustrated in FIG. 4c so that fluid flow is toward the accumulator 26. The arrangement is such then that upon sensing extension or compression of the struts on one side of the vehicle as compared to the other, the appropriate pumps/motors 72, 76, 80 and 82 automatically react to provide additional fluid to the compressed side while receiving fluid from the extended side, thus restoring the vehicle chassis to the normal level position with respect to the wheels 14. Indeed, the system reacts sufficiently fast so that the vehicle virtually remains in the neutral position.

The forgoing description has been made in conjunction with a vehicle operating on the side of a hill, but it can be appreciated that such also applies to vehicles making a turn since the side of the vehicle away from the center of the turn is loaded as was the downhill side of the vehicle on the hill side. Thus, the reaction of the system 10 maintains the vehicle in the normal, level position.

Also, it will be appreciated that all of the components of the system 10 are interconnected so that, should pitch occur from either acceleration of the vehicle or sudden deceleration thereof, the appropriate pumps/motors operate to provide additional fluid to the compressed end of the vehicle while receiving fluid from the other end of the vehicle. Thus, the system 10 maintains the normal level position of the vehicle against pitching forces.

Figure 5:
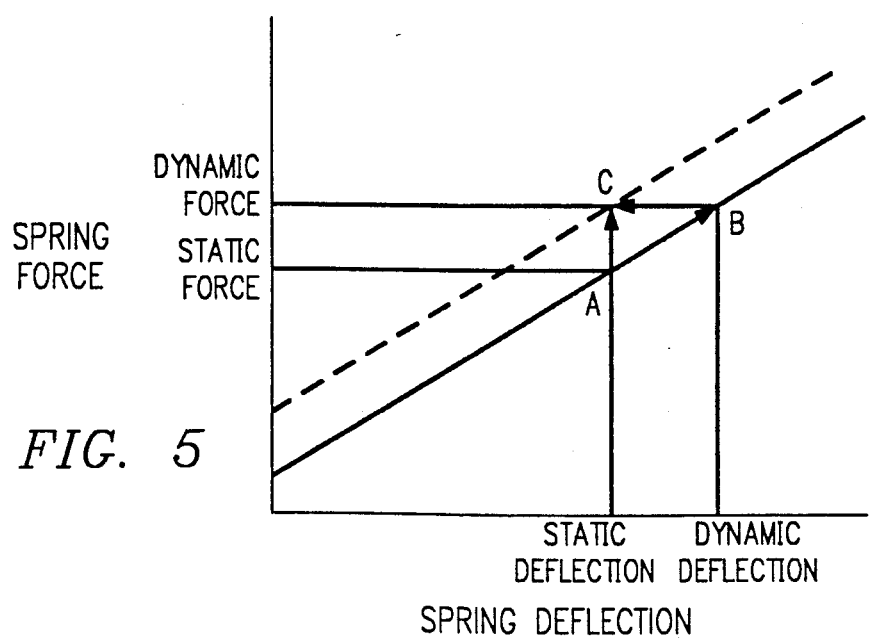
FIG. 5 is a graph illustrating the effect of using the suspension system constructed in accordance with the invention.

The aforesaid relationships can be seen in the chart of FIG. 5. As illustrated therein, the force increase A-C in the struts attempts to move the piston 40 therein from position C to B. The system 10 operates to prevent the movement or deflection of the piston 40 and rod 42 from B to C which would normally occur because the system 10 has almost immediately provided fluid flow to the loaded strut. The appropriate amount of fluid to accomplish this is automatically provided by the variable displacement pump/motor assembly 24 described.

The system 10 also provides additional benefits as may be appreciated by comparing the charts of FIGS. 6 and 7. FIG. 6 illustrates a system, such as the system 10, wherein the accumulator assembly 26 is not utilized. That is, the system is not preloaded with the static pressure near the strut pressure required to support the weight of the suspended parts of the vehicle. During a turn as illustrated in FIG. 6, the energy necessary to extend the outside inside strut area 99 and the energy recovered to compress the inside strut area 100 are shown by the cross-sectioned areas under the curve. The total energy required is the difference of those two areas.

Positioning the rotor 87 of the pump/motor 24 to allow fluid flow from the strut 20 to flow to the reservoir allows the recovery of energy indicated by area 100. Recovering this energy minimizes, to the extent possible, the total energy requirement of the system.

After the turn, energy (area 100) is required to extend the inside strut and energy (area 99) is recovered during compression of the outside strut. Thus, the total theoretical energy requirement of the system 10 is zero. This is a result of the ability of the pump/motor 24 to allow fluid flow from the strut 20 to flow to the reservoir while the pump/motor is displaced toward the motor position.

In FIG. 7, the same curve is illustrated, but in a system such as the system 10 which utilizes the accumulator assembly 26. In this system, the static preload force, that is, the pressure equal to the strut pressure required to support the suspended weight of the vehicle is provided by the accumulator assembly 26. Accordingly, the energy required to extend the outside strut is illustrated by the small triangular area 103. The energy required to compress the inside strut shown by the remaining cross-sectioned triangular area 101. The total energy required is the sum of the areas 101 and 103. The theoretical energy required for the suspension system 10 with or without an accumulator 26 acting as the reservoir for the pump/motor 24 is identical. The operating efficiency of the system 10 without the accumulator 26 will be lower than with the accumulator 26 because the increased differential pressure across the pump/motor will be higher. All pump/motor devices have lower efficiencies with higher differential pressures.

In either of the above examples, most of the energy expended is recovered after the turn or after the imbalance of the vehicle has been restored. It should be pointed out that two advantages are provided by introducing the static preload pressure into the system. Those advantages are: (1) substantially less time is required for the system to react to the imbalance and be certain that the vehicle remains essentially at the normal level and position; and (2) that the pumps operate more efficiently and will last substantially longer. The longer life is due to reduction of the pressure differential across the pumps. As can be seen from comparing FIGS. 6 and 7, the pressure does not need to be raised from virtually zero to the maximum required for restoration when using the accumulator assembly 26 since the preload pressure is already in the system 10. At static normal level operation the vehicle, the differential across the pump assembly 24 is nil. The pump assembly 24 is operating in an environment wherein the differential pressure thereacross is substantially reduced as compared to a system that does not include the accumulator assembly 26.

From the foregoing, it will be appreciated that the preferred embodiment of suspension system 10, an active suspension system that is less complex and expensive than other systems and one that provides an enhanced ride due to the resiliency provided under damped conditions and due to the ability of the system 10 to maintain the normal level attitude of the vehicle.

EMBODIMENT OF FIG. 8

Figure 8:
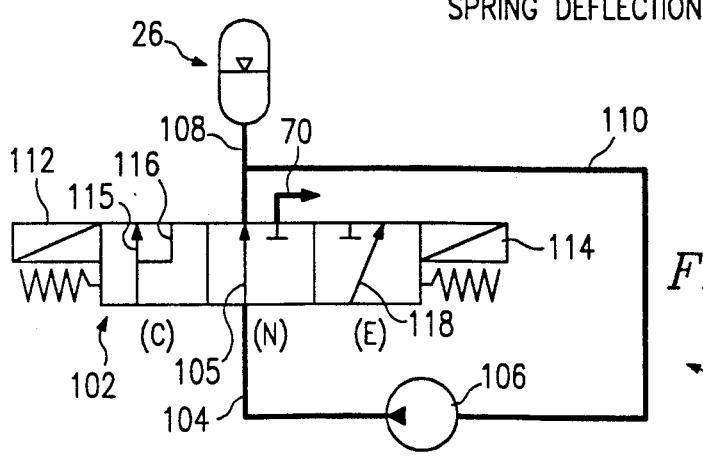
FIG. 8 is an enlarged schematic view of a portion of another embodiment of suspension system that is also constructed in accordance with the invention.

FIG. 8 is a partial schematic of a suspension system that is generally designated by the reference character 200. In FIG. 8, identical parts have been identified by the same reference characters as used in the description of the embodiment 10.

Although not shown, it will be understood that the conduit 70 is connected to the suspension assembly 20 as was previously described. The opposite end of the conduit 70, in this instance, is connected to a solenoid controlled multi-port valve 102 which is in turn connected by a conduit 104 with a fixed displacement pump 106. Although not illustrated, a valve 102 and a pump 106 will be provided for each strut assembly 16, 18, 20 and 22.

The valve 102 is connected by a conduit 108 with the accumulator assembly 26. Accumulator assembly 26 is connected by a conduit 110 with the inlet to the pump 106.

As illustrated, the valve 102, in addition to pilot operators 112 and 114, is provided with a neutral position (N) wherein fluid is delivered from the pump 106 through the conduit 104, through port 105 to a conduit 108. The fluid flows through conduit 110 back to the pump 106. As shown therein, in the neutral position (N), the conduit 70 is closed off and no fluid is flowing to the strut assembly 20.

The valve 102 is also provided with a position (C) which is ported in such a manner that fluid is circulated from the fixed displacement pump 106 through the conduit 104 into the conduit 115 and into conduit 108 to the reservoir accumulator assembly 26 and through the conduit 110 returning to the pump 106. A parallel port 116 is connected to the conduit 70 providing hydraulic fluid from the strut assembly 20 to the accumulator reservoir. When in this position, the strut 20 can compress due to the bypassing of fluid as previously described.

When it is desired to provide fluid from the pump 106 directly to the conduit 70, the valve 102 is moved to a position (E) which has a port 118 that extends directly from the connection with the conduit 104 to the conduit 70 blocking off the pump flow path to the conduit 108. When in this position, fluid flows directly to the strut assembly 20.

While the system 100 operates, it is less desirable than the system 10 because it is necessary to constantly reposition the valve 102 to provide proper flow control to the strut assembly 20 depending on the loading conditions thereof.

Various types of pumps could be utilized in the systems 10 and 100, but the variable displacement pumps described in connection with the embodiment of FIG. 1 are preferred.

Many changes and modification can be made to the embodiments described in detail hereinbefore without departing from the spirit o scope of the invention.

What is claimed:

1. A suspension system comprising:
    hydraulic suspension strut means for resiliently supporting and damping movement between suspended and unsuspended parts of a mass or energy system;
    flow means for providing hydraulic fluid flow to/from said strut means; and
    accumulator means for pressurizing said hydraulic fluid, a gas over hydraulic accumulator located at said suspension strut means and connected with said flow means, said accumulator means including a system accumulator connected with said flow means to pressurize said system to resiliently support said suspended parts in the static condition and to pressurize said flow means to reduce the pressure thereacross.

2. A suspension system comprising:
    hydraulic suspension strut means for resiliently supporting and damping movement between suspended and unsuspended parts of a mass or energy system;
    flow means for providing hydraulic fluid flow to/from said strut means, said flow means including a variable displacement pump/motor, said pump/motor permitting reverse flow therethrough to allow fluid flow from said strut means when said strut is to be compressed, permitting no flow, and permitting forward flow to said strut means when said strut is to be extended; and
    accumulator means for pressurizing said hydraulic fluid.

3. A suspension system for a vehicle that includes a chassis and a plurality of vehicle support ,member, said system including:
    hydraulic suspension strut means for resiliently supporting and damping the movement between the chassis and the support members;
    flow means for providing hydraulic fluid flow to and from each of said strut means; and
    accumulator means for pressurizing said hydraulic fluid, a gas over hydraulic accumulator located at said suspension strut means and connected with said flow means, said accumulator means including a system accumulator connected with said flow means to perssurize said system to resiliently support said suspended parts in the static condition and to pressurize said flow means to reduce the pressure thereacross when said system is in operation.

4. The system of claim 3 wherein said hydraulic strut means includes:
    a body member having a generally cylindrical bore and mounted on one of said parts;
    a piston including a piston rod located in said bore for reciprocating movement and having said rod connected with the other of said parts;
    control means connected with said pump means and with said body member for controlling the flow of said pressurized hydraulic fluid into and out of said bore on both sides of said piston.

5. The system of claim 4 wherein said control means includes on each side of said piston:
    a check valve for permitting fluid flow into said bore and preventing flow in the opposite direction;
    a variable orifice connected in a parallel flow arrangement with said check valve for damping flow therethrough; and
    a pressure relief valve connected in a parallel flow arrangement with said check valve and variable orifice for permitting flow through said relief valve when the pressure in said bore exceeds a predetermined value.

6. The system of claim 5 and also including an accumulator connected with said control means, said accumulator including a compressible gas whereby said piston and rod is resiliently supported by said fluid in said bore providing resiliency between said parts.

7. A suspension system for a vehicle that includes a chassis and a plurality of vehicle support members, said system including:
- hydraulic suspension strut means for resiliently supporting and damping the movement between the chassis and the support members;
- flow means for providing hydraulic fluid to and from each of said strut means, said flow means including a variable displacement pump/motor, said pump/motor permitting reverse flow therethrough to allow fluid flow from said strut means when said strut is to be compressed, permitting no flow, and permitting forward flow to said strut means when said strut is to be extended; and
- accumulator means for pressurizing said hydraulic fluid.

8. The system of claim 7 wherein said pumps/motors have a common drive shaft.

* * * * *

UNITED STATES PATENT AND TRADEMARK OFFICE
CERTIFICATE OF CORRECTION

PATENT NO.  :  5,020,826
DATED       :  June 4, 1991
INVENTOR(S) :  Gary L. Stecklein, et al It is certified that error appears in the above-identified patent and that said Letters Patent is hereby corrected as shown below:

Claim 3, Column 8, line 37, delete "perssurize" and insert --pressurize--.

Claim 3, Column 8, line 24, delete "vehicle support, member," and insert
    --vehicle support members,--.

Signed and Sealed this

Twenty-fifth Day of May, 1993

Attest:

MICHAEL K. KIRK

*Attesting Officer*          *Acting Commissioner of Patents and Trademarks*